US012576411B2

(12) United States Patent
Yee et al.

(10) Patent No.: US 12,576,411 B2
(45) Date of Patent: Mar. 17, 2026

(54) DIRECT ACCESS SPRAY SELECTION ENGINE FOR WATER DELIVERY DEVICES

(71) Applicant: Kohler Co., Kohler, WI (US)

(72) Inventors: Evan Yee, Grafton, WI (US); Brian S. Core, Fond du Lac, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 18/604,188

(22) Filed: Mar. 13, 2024

(65) Prior Publication Data

US 2024/0216931 A1 Jul. 4, 2024

Related U.S. Application Data

(63) Continuation of application No. 17/013,322, filed on Sep. 4, 2020, now Pat. No. 11,958,065.

(60) Provisional application No. 62/898,177, filed on Sep. 10, 2019.

(51) Int. Cl.
*B05B 1/16* (2006.01)
*B05B 1/02* (2006.01)
*B05B 1/18* (2006.01)

(52) U.S. Cl.
CPC ................ *B05B 1/169* (2013.01); *B05B 1/02* (2013.01); *B05B 1/185* (2013.01)

(58) Field of Classification Search
CPC ......... B05B 1/1681; B05B 1/169; B05B 1/02; B05B 1/18; B05B 1/185; B05B 1/1609; B05B 1/3013; B05B 12/002; B05B 1/3026; B05B 1/16; B05B 1/1636; B05B 1/1618; B05B 1/1654
USPC ................................ 239/392, 391, 396, 397
See application file for complete search history.

(56) References Cited

U.S. PATENT DOCUMENTS

| | | | |
|---|---|---|---|
| 3,998,390 | A | 12/1976 | Peterson et al. |
| 5,542,909 | A | 8/1996 | Camp |
| 6,145,757 | A | 11/2000 | Knapp |
| 6,739,523 | B2 | 5/2004 | Haverstraw et al. |
| 6,959,731 | B2 | 11/2005 | Bartkus et al. |
| 7,080,795 | B2 | 7/2006 | Chen |
| 7,159,797 | B1 | 1/2007 | Lammers |
| 7,370,814 | B2 | 5/2008 | Chih |
| 7,909,269 | B2 | 3/2011 | Erickson et al. |
| 8,020,786 | B2 | 9/2011 | Lo |
| 8,113,442 | B2 | 2/2012 | Li et al. |
| 8,276,833 | B2 | 10/2012 | Cheng et al. |
| 8,881,993 | B2 | 11/2014 | Lev |
| 8,919,676 | B2 | 12/2014 | Funseth et al. |
| 9,050,612 | B2 | 6/2015 | Miller et al. |
| 9,095,860 | B2 | 8/2015 | Zhou et al. |

(Continued)

*Primary Examiner* — Arthur O. Hall
*Assistant Examiner* — Juan C Barrera
(74) *Attorney, Agent, or Firm* — Foley & Lardner LLP

(57) ABSTRACT

A water delivery device includes an inlet connector, a sprayface assembly, and a selection engine. The inlet connector is configured to couple the water delivery device to a water supply. The sprayface assembly includes a plurality of nozzles that are configured to produce a plurality of spray patterns. The selection engine fluidly couples the inlet connector to the sprayface assembly and controls flow to each one of the plurality of nozzles to determine the spray pattern produced at the sprayface assembly. The selection engine is configured to switch directly from any one of the plurality of spray patterns to any other one of the plurality of spray patterns in response to a single actuation of the selection engine.

7 Claims, 7 Drawing Sheets

(56) References Cited

U.S. PATENT DOCUMENTS

| | | | |
|---|---|---|---|
| 9,182,045 | B2 | 11/2015 | Brouwer et al. |
| 9,702,127 | B2 | 7/2017 | Lev |
| 9,743,822 | B2 | 8/2017 | Boyer et al. |
| 9,757,740 | B2 | 9/2017 | Erickson et al. |
| 9,814,227 | B2 | 11/2017 | Crenshaw |
| 9,868,125 | B2 | 1/2018 | Macsay |
| 2009/0206178 | A1 | 8/2009 | Nobili |
| 2009/0206179 | A1 | 8/2009 | Nobili |
| 2009/0314851 | A1 | 12/2009 | Bonacci |
| 2013/0239320 | A1 * | 9/2013 | Aihara .................... B05B 1/169 4/615 |
| 2014/0054391 | A1 * | 2/2014 | Schroeder ............... B05B 1/185 239/444 |
| 2014/0084082 | A1 | 3/2014 | Glunk et al. |
| 2015/0238984 | A1 | 8/2015 | Lee |
| 2018/0085763 | A1 | 3/2018 | Leckner |
| 2019/0299223 | A1 | 10/2019 | Yu |
| 2020/0197961 | A1 | 6/2020 | Zhang et al. |

* cited by examiner

DIRECT ACCESS SPRAY SELECTION ENGINE FOR WATER DELIVERY DEVICES

CROSS-REFERENCE TO RELATED PATENT APPLICATIONS

This application is a continuation of U.S. patent application Ser. No. 17/013,322, filed Sep. 4, 2020, which claims the benefit of and priority to U.S. Provisional Application No. 62/898,177, filed Sep. 10, 2019, the entire disclosures of which are hereby incorporated by reference herein.

TECHNICAL FIELD

The present application relates generally to the field of valves and engines for water delivery devices, such as spray heads, showerheads, body sprays, hand showers and the like. More specifically, this application relates to selection engines and diverter valves that can directly route water between multiple sprays without having to cycle the device through a specific sequence.

BACKGROUND

Diverters providing flow between multiple nozzles for different spray patterns requiring a specific sequence can be annoying for users. Further, for sprayers that provide four or more different spray patterns, there is no way to directly select (e.g., select through a single manipulation or movement) each of the three non-active patterns without first moving (e.g., rotating a portion of, cycling, etc.) the sprayer through one or more undesired modes/spray patterns. Thus, it would be advantageous to provide a direct-access spray diverter that utilizes a configuration that allows a user to select any spray pattern at any time, regardless of the active pattern, without having to sequence or cycle through other spray patterns.

SUMMARY

One exemplary embodiment relates to a water delivery device including an inlet connector, a sprayface assembly, and a selection engine. The inlet connector is configured to couple the water delivery device to a water supply. The sprayface assembly includes a plurality of nozzles that are configured to produce a plurality of spray patterns. The selection engine fluidly couples the inlet connector to the sprayface assembly and controls flow to each one of the plurality of nozzles to determine the spray pattern produced at the sprayface assembly. The selection engine is configured to switch directly from any one of the plurality of spray patterns to any other one of the plurality of spray patterns in response to a single actuation of the selection engine.

Another exemplary embodiment relates to a selection engine for a water delivery device. The selection engine includes a housing and a pivot plate. The housing defines a bore, an inlet port, and at least four outlet ports. The pivot plate is disposed in the bore and pivotably coupled to the housing. The pivot plate includes a plurality of plugs, each plug configured to selectively fluidly couple the inlet port to a respective one of the at least four outlet ports.

Yet another exemplary embodiment relates to a selection engine for a water delivery device. The selection engine includes a housing and a plurality of disks rotatably received in the bore. The inlet port is selectively fluidly coupled to a first pair of the at least four outlet ports by a first disk of the plurality of disks, and is selectively fluidly coupled to a second pair of the at least four outlet ports by a second disk of the plurality of disks, the first disk arranged in parallel with the second disk.

BRIEF DESCRIPTION OF THE DRAWINGS

The disclosure will become more fully understood from the following detailed description, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are engines/valves (e.g., diverter valves, selection engines, etc.) for controlling water flow through water delivery devices, such as spray heads, showerheads, hand showers, body sprays and the like. The engines/valves of this application are able to control the flow to multiple outlets (e.g., at least four outlets), such as to provide multiple spray patterns, without having to sequence or cycle through the positions/modes corresponding to the intervening outlets/spray patterns. Instead, a user can directly select any one of the modes/positions with a single manipulation (e.g., movement) of the device.

Figure 1:
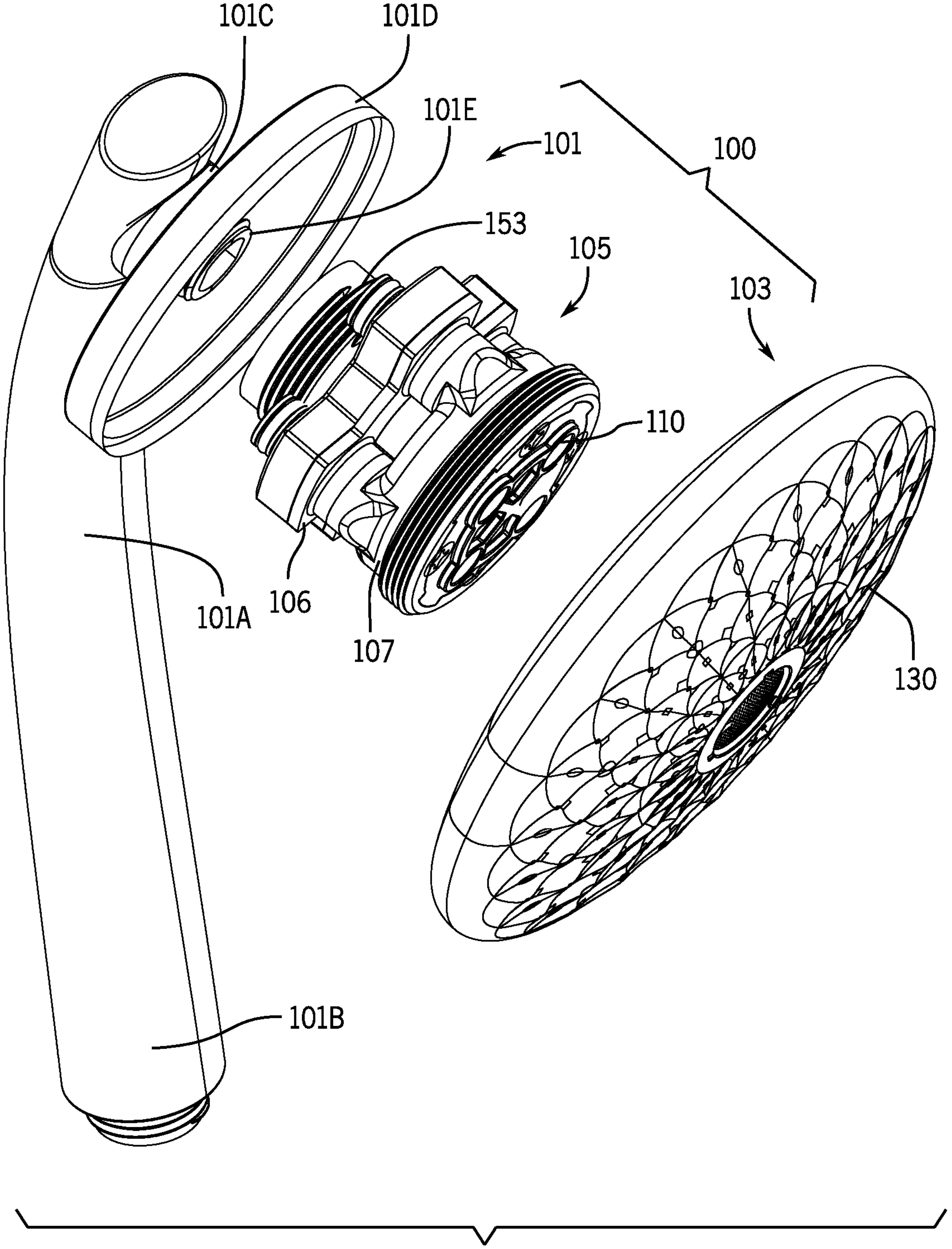
FIG. 1 is a partially exploded perspective view of an exemplary embodiment of a water delivery device, according to this application.
Figure 2:
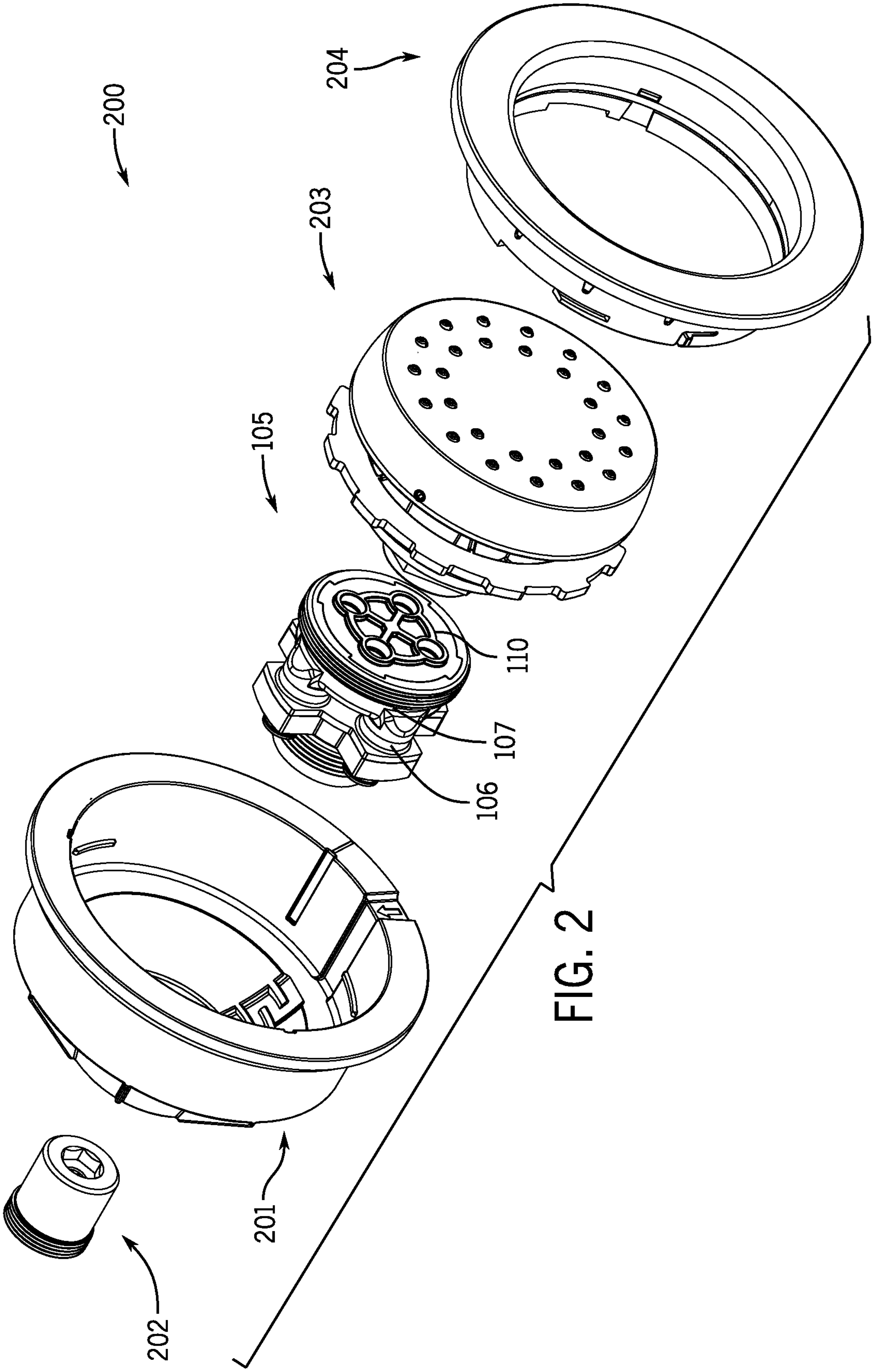
FIG. 2 is a partially exploded perspective view of an exemplary embodiment of a water delivery device, according to this application.
Figure 3:
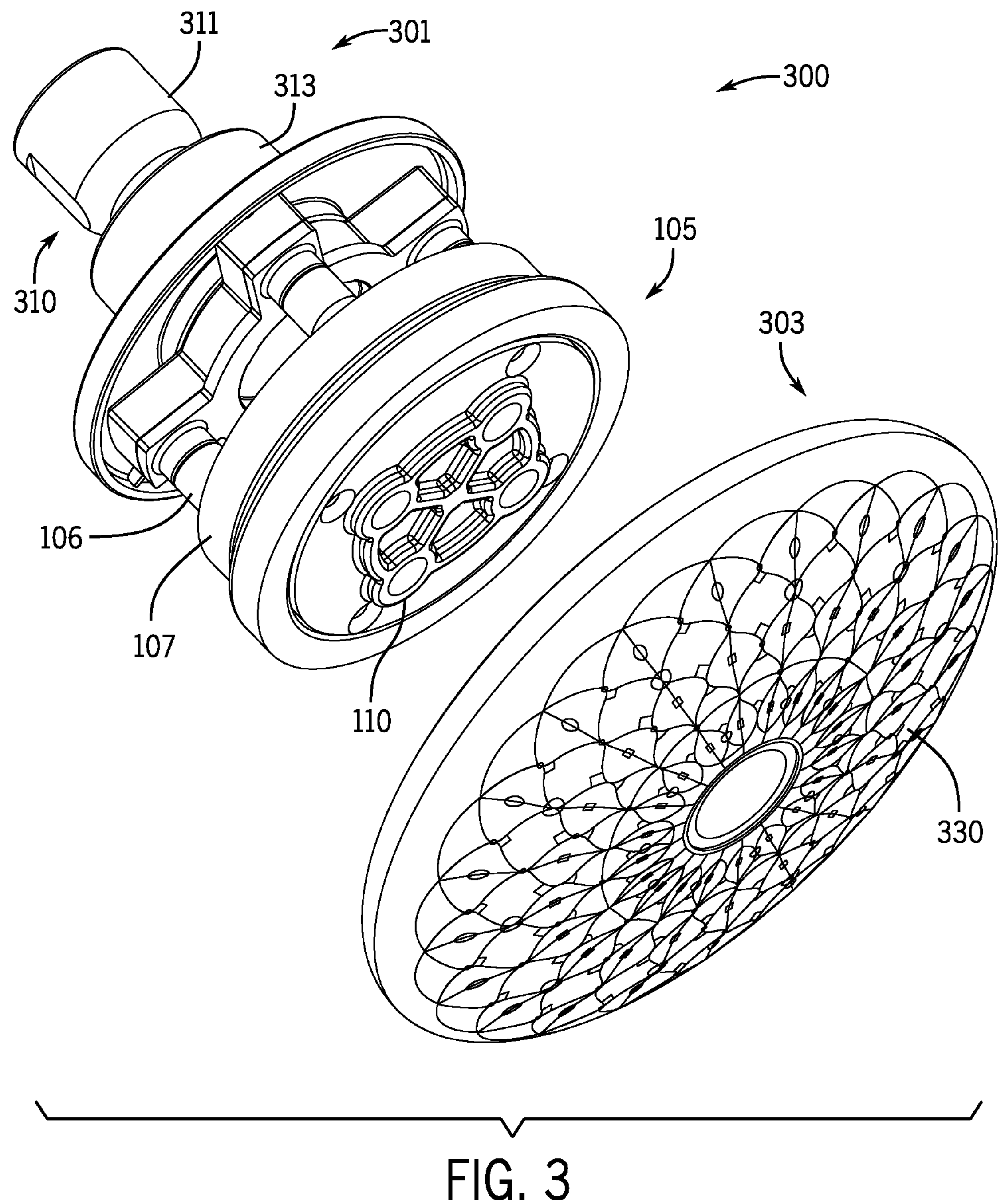
FIG. 3 is a partially exploded perspective view of an exemplary embodiment of a water delivery device, according to this application.

FIGS. 1-3 illustrates various embodiments of water delivery devices that include the selection engines of this application. Notably, the term "water delivery device" is not limited to only the types shown and described herein, but rather the term, as used herein, covers all types of water delivery devices for use in household applications (e.g., kitchens, bathrooms) and the like.

FIG. 1 illustrates an exemplary embodiment of a water delivery device in the form of a movable hand shower 100 having a base or handle assembly 101, a sprayface assembly 103, and a valve/selection engine 105. The handle assembly 101 includes a handle body 101A extending between first and second ends 101B, 101C, respectively. The first end 101B (e.g., an inlet connector at the first end) couples to or receives a water supply, such as a hose (not shown); and the second end 101C is fluidly connected to the first end 101B. As shown, the second end 101C includes a cup shaped projection 101D and a threaded boss 101E with an opening therein to supply water to the selection engine 105. The sprayface assembly 103 is configurable, such as according to known designs, having a sprayface 130 with a plurality of nozzles (e.g., orifices) for emitting/delivering water as one or more spray patterns. The plurality of nozzles is divisible into one or more sets of nozzles where each set of nozzles corresponds to one spray pattern. According to an exemplary embodiment, the sprayface 130 includes three/four sets of nozzles corresponding to three/four different spray patterns, which emit water in associated operational modes.

FIG. 2 illustrates an exemplary embodiment of a water delivery device in the form of a body spray 200 having a housing 201, an inlet 202 (e.g., inlet connector), a sprayface or nozzle assembly 203, a cover 204, and a valve/selection engine 105, which may be the same as the valve/selection engine 105 used in the hand shower 100 of FIG. 1. The illustrated housing 201 is cup shaped to receive the selection engine 105 and nozzle assembly 203, and further receives the inlet 202, which is configurable to receive water from a supply. The housing 201 is configurable in or behind a wall, such as a shower wall, with the nozzle assembly 203 visible. The illustrated cover 204 is annular shaped to receive the nozzle assembly 203 through an outlet opening, and the cover 204 couples to the housing 201 to secure and/or retain the selection engine 105 and nozzle assembly 203 therebetween in an inner compartment of the housing 201. The nozzle assembly 203 includes at least one plurality of nozzles, which is divisible into one or more sets of nozzles, as discussed above. The selection engine 105 is fluidly connectable to the inlet 202 to receive fluid and to the nozzle assembly 203 to selectively direct fluid from the inlet 202 to the nozzles.

Figure 4:
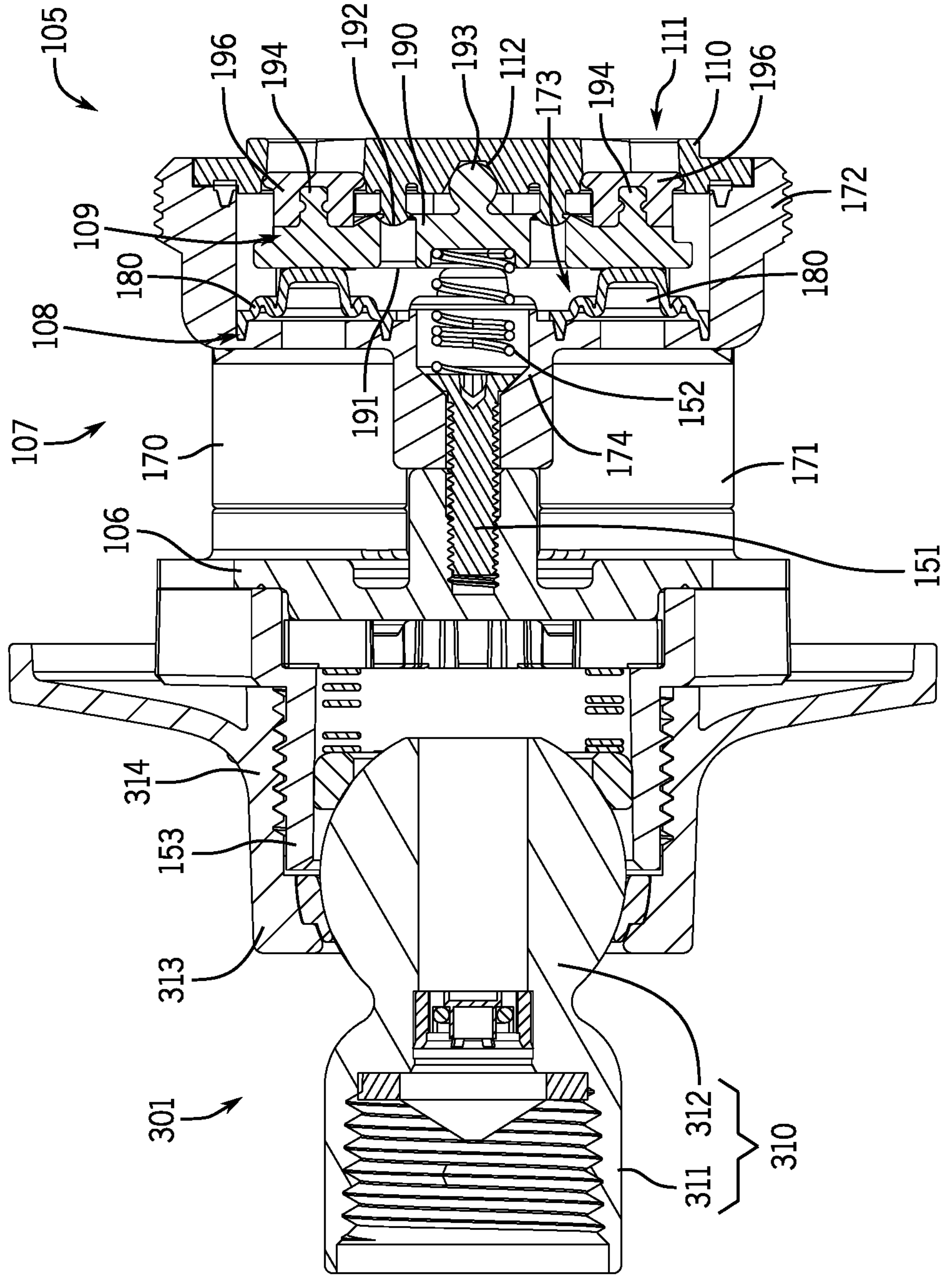
FIG. 4 is a cross-sectional view of the water delivery device shown in FIG. 3.

FIGS. 3 and 4 illustrate an exemplary embodiment of a water delivery device in the form of a showerhead 300 having a base assembly 301, a sprayface assembly 303, and a valve/selection engine 105, which may the same as or similar to the valve/selection engine 105 used in the hand shower 100 of FIG. 1 and/or the body spray 200 of FIG. 2. The base assembly 301 includes connector 310 (e.g., an inlet connector) for mounting the showerhead, such as to a fluid/supply pipe (not shown). As shown, the illustrated connector 310 includes a threaded sleeve 311 for mounting and a spherical or ball joint 312 attached downstream of the sleeve 311. A collar 313 of the base assembly 301 pivotally couples to the ball joint 312 to provide free rotation/pivoting of the sprayface assembly 303 relative to the ball joint 312. The collar 313 includes a cup shaped projection 314 for receiving the selection engine 105 and/or for coupling to the sprayface assembly 303. As shown in FIG. 3, the sprayface assembly 303 has a sprayface 330 with a plurality of nozzles for emitting/delivering water as one or more spray patterns. The plurality of nozzles is divisible into one or more sets of nozzles where each set of nozzles corresponds to one spray pattern, such as discussed herein.

For each water delivery device (e.g., the hand shower 100 of FIG. 1, the body spray 200 of FIG. 2, and the showerhead 300 of FIG. 3), the selection engine 105 allows a user to easily switch to any one operational mode to provide one (or more) of the spray patterns without having to cycle or sequence through various other operational modes. Moreover, the user can switch to any operational mode directly from any other operational mode with a single manipulation (e.g., movement) of the device. These aspects are discussed in more detail below.

Figure 6:
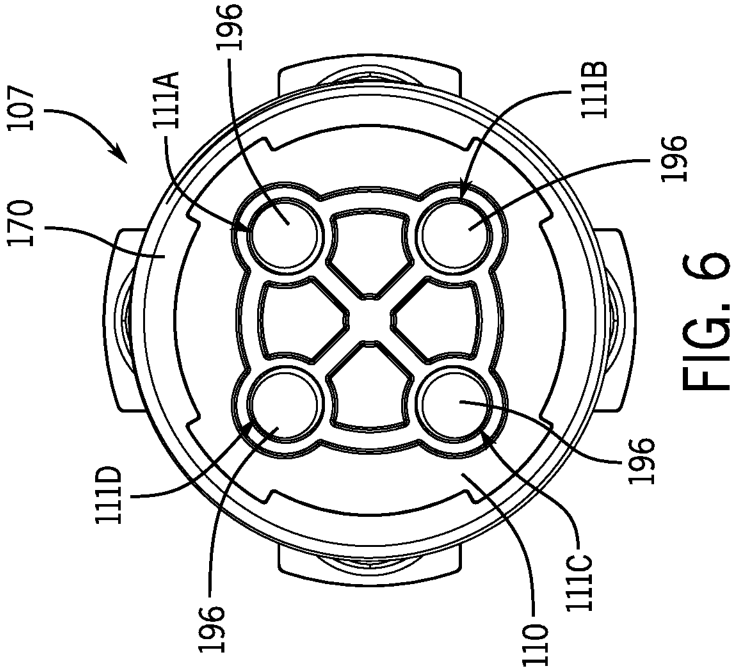
FIG. 6 is a bottom view of the selection engine shown in FIG. 5.
Figure 5:
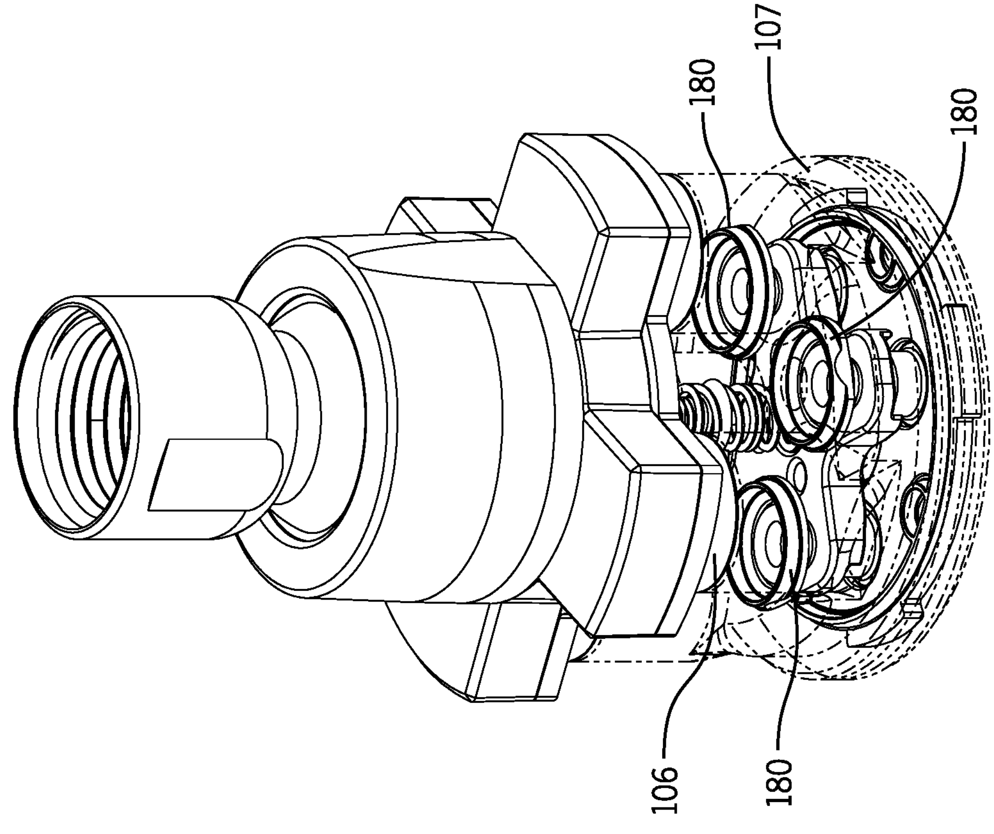
FIG. 5 is a perspective view of an exemplary embodiment of a selection engine for use in a water delivery device.

FIGS. 4-6 illustrate an exemplary embodiment of the selection engine 105 integrated into the showerhead 300 shown in FIG. 3. The illustrated selection engine 105 includes a base plate 106, a housing 107, a diaphragm 108, a pivot plate 109, and a face or outlet plate 110. Although, the selection engine 105 can include a fewer or a greater number of elements.

The housing 107 has a body 170 extending between an inlet or first end 171 and an outlet or second end 172. The illustrated body 170 is cylindrical, however, the body 170 can have other shapes. The first end 171 includes one or more openings or inlets for receiving water, such as from a fluid passageway in the connector 310 for the showerhead 300 shown in FIG. 4. The opening(s) in the first end 171 fluidly connect to a bore 173 disposed in the second end 172 through one or more fluid ports/outlets. For example, the body 170 can include one port/outlet associated with each outlet/port in the outlet plate 110 (discussed below). As shown, an outer annular wall defining the second end 172 defines the bore 173, which receives the diaphragm 108, the pivot plate 109 and/or the outlet plate 110. The housing 107 couples to the base plate 106 and/or another element, such as a sprayface assembly (e.g., the sprayface assembly 303 of FIG. 3). As shown in FIGS. 3-4, threads along the second end 172 thread to an element of the sprayface assembly 303 to couple the selection engine 105 and sprayface assembly 303 together. As shown in FIG. 3, an internal hollow projection 174 extends from the body 170 into the bore 173, such that the projection 174 can optionally receive a fastener 151, which couples the housing 107 to the base plate 106, and/or a spring 152 for biasing the diaphragm 108 and/or the pivot plate 109 relative to the housing 107.

The base plate 106 couples to the first end 171 of the housing 107, such as through the fastener 151, another type of mechanical fastener, a weld, an adhesive, and/or another suitable fastening device or method. The base plate 106 couples the selection engine 105 to another element, such as the collar 313 for the showerhead 300 (see also FIG. 3), either directly or indirectly, such as through a mounting bracket. The base plate 106 fluidly connects the housing 107 to water from the supply/source, such as the fluid passageway in the connector 310, through one or more fluid ports in the base plate 106.

The diaphragm 108 includes one or more diaphragm members 180. As shown in FIGS. 4 and 5, the diaphragm 108 includes four separate diaphragm members 180, where each diaphragm member 180 associates with a respective one of the outlets/ports, shown as outlet 111, in the outlet plate 110. Notably, the diaphragm members 180 may be integrally formed together as one element. Each diaphragm member 180 is compressible, compliant and/or flexible and is, thus, made from a material that provides such compressibility/compliance/flexibility, such as a rubber or elastomer (although other types of materials can be used). In a first position, each diaphragm member 180 seals the associated port in the body 170 to prevent the flow of water from the port in the body 170 to the associated outlet 111 in the outlet plate 110. In a second position, each diaphragm member 180 unseals the associated port in the body 170 to allow water to flow from the port to the associated outlet in the outlet plate 110. According to at least one embodiment, a portion of each diaphragm member 180 presses against a portion of an inner surface 191 of the pivot plate 109 in the second position. Each diaphragm member 180 can correspond to one plug 196 of the pivot plate 109, such that upon activating a given diaphragm member 180, the corresponding plug 196 fills a corresponding outlet 111 in the outlet plate 110. The shape of the diaphragm conforms to the outlets during pivoting motion to allow flow out of one port at a time. The system maintains sealing on inactive ports during actuation.

The pivot plate 109 includes a cylindrical body 190 having an inner surface 191 and an outer surface 192. A ball 193 extends from the outer surface 192 to engage a socket 112 in the outlet plate 110, such that the ball 193 and socket form a fulcrum (e.g., point) about which the pivot plate 109 freely pivots (i.e., rocks, tilts, etc.). The pivot plate 109 includes a post 194 extending away from the outer surface 192 for each outlet 111 in the outlet plate 110. The illustrated embodiment includes four posts 194, where each post 194 associates with one of the four outlets 111A-111D (see FIG. 6). As shown in FIGS. 4 and 6, the illustrated embodiment also includes one plug 196 coupled to each post 194 and associated with one of the four outlets 111A-111D. Each plug 196 is configured to selectively fluidly couple a port in the body 170 with a respective one of the outlets 111 (e.g., is configured to selectively fluidly couple the bore 173 with a respective one of the outlets 111). Each plug 196 moves between an engaging or sealing position, in which the plug 196 seats within and seals the associated outlet 111, and a disengaging or unsealing position, in which the plug 196 unseats from and unseals the associated outlet, upon relative movement (e.g., pivoting) between the pivot plate 109 and the outlet plate 110. Each plug 196 is compressible, compliant and/or flexible and is, thus, made from a material that provides such compressibility/compliance/flexibility, such as a rubber or elastomer (although other types of materials can be used).

The outlet plate 110 couples to the housing 107 in a fluid tight manner about an outer periphery of the outlet plate 110. The outlet plate 110 is disposed at an axial end of the body 170 and substantially covers the axial end. An optional sealing gasket can seal between the outer plate 110 and the housing 107. The outlet plate 110 includes one or more outlets 111 for outputting fluid flow, such as to a sprayface assembly. As shown in FIG. 6, the outlet plate 110 includes four outlets 111A-111D, which, for example, may fluidly connect to four sets of nozzles for discharging/emitting water into multiple spray patterns and/or including multiple operational modes. As shown in FIG. 4, the outlet plate 110 includes a socket 112 in an inner side (e.g., facing the pivot plate 109), where the socket 112 receives the ball 193 of the pivot plate 109, such that the pivot plate 109 and outlet plate 110 can freely pivot relative to one another.

The selection engine 105 may optionally include a mounting bracket 153 and/or a biasing member (e.g., spring). As shown, the mounting bracket 153 includes a first end, which couples to the base plate 106, and a second end, which couples the selection engine 105 to another device. For example, the second end of the mounting bracket 153 can include threads that thread to the collar 313, as shown in FIG. 4. The biasing member shown in FIG. 4 is an extension or coil spring 152 disposed between the housing 107 (e.g., the body 170 thereof) and the pivot plate 109 (e.g., the inner surface 191). A bore in the inner surface 191 can receive and retain an end of the spring 152, which presses against the pivot plate 109 (e.g., the inner surface 191 or a surface defining the bore therein) with sufficient force to hold the ball 193 the pivot plate 109 in the socket 112 of the outlet plate 110.

During operation, relative movement between the outlet plate 110 and the pivot plate 109 moves one or more of the plugs 196 relative to its associated outlet 111 between the engaging and disengaging positions to prevent/allow, respectively, water flow through the associated outlet 111. The ball 193 and socket 112 connection allows relative free pivoting between the outlet plate 110 and the pivot plate 109, so that any number of plugs 196 can engage or disengage their respective outlets 111. Thus, for the embodiment shown in FIG. 4 having four outlets, any number of outlets 111 (e.g., 0, 1, 2, 3, 4) can be engaged by plugs 196 and any number can be disengaged, so that water can flow through none, one, two, three, or all four of the outlets. Notably, leaving at least one outlet open helps relieve pressure from building within the selection engine 105. Further, a single motion can switch the device from any one operational mode, corresponding to one spray pattern, to any other operational mode, corresponding to another spray pattern.

The relative motion between the pivot plate 109 and the outlet plate 110 is configurable for manual articulation, such as by a user, or automatic articulation, such as using an electro-mechanical device. For example, articulation or motion (e.g., tilting) of the pivot plate 109 can be driven by a motion driving mechanism, such as one or more linear actuators, solenoids, motors, a combination of linear and rotary motions, etc. In some configurations, the pivot plate 109 may be disposed at a distance from the outlet plate 110, such that only one of the plugs 196 is not disposed in an outlet at any given time. The devices, such as the selection engine 105, can include a retention mechanism for retaining the pivot plate 109 and the outlet plate 110 is one or more relative positions. That is, the retention mechanism can hold the device in the current operational mode following a user changing the mode. If the device has, for example, four operational modes, the retention mechanism can hold the device in any one of the four modes until a user changes the mode of operation.

Notably, the selection engine 105 is configurable into other water delivery devices beyond the movable hand shower 100 shown in FIG. 1, the body spray 200 shown in FIG. 2, and the showerhead 300 shown in FIG. 3. The embodiments shown in FIGS. 1-3 are exemplary and not limiting.

FIGS. 7-12 illustrate an exemplary embodiment of a selection engine 405 for use in any suitable water delivery device, such as those described herein or elsewhere. For example, the selection engine 405 is configurable in the movable hand shower 100 shown in FIG. 1, the body spray 200 shown in FIG. 2, and/or the showerhead 300 shown in FIG. 3.

The illustrated selection engine 405 includes a housing 406, a first disk 407 (e.g., upper disk), and a second disk 408 (e.g., lower disk). Each disk 407, 408 is independently rotatable relative to the housing 406 to control fluid flow through the selection engine 405.

Figure 7:
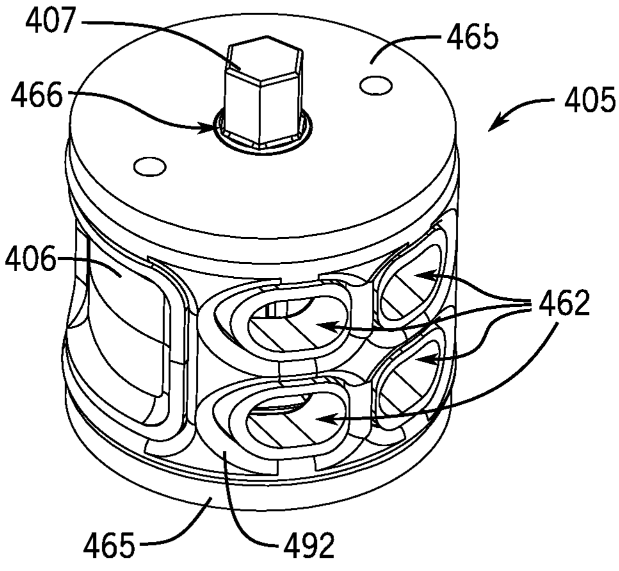
FIG. 7 is a perspective of an exemplary embodiment of a selection engine for use in a water delivery device.
Figure 8:
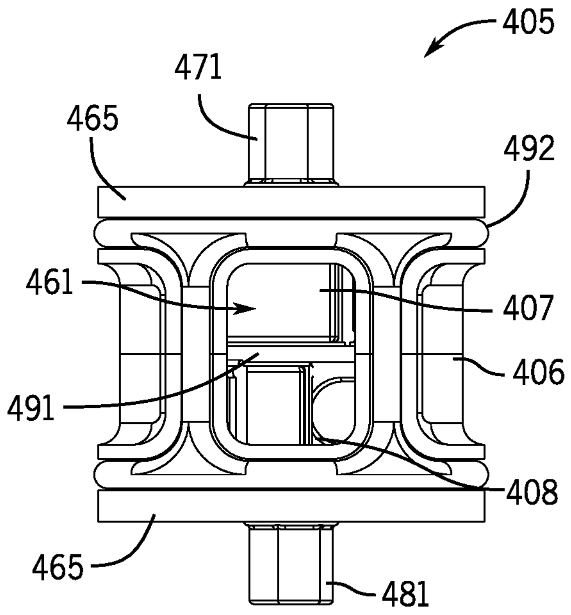
FIG. 8 is a plan view of the selection engine shown in FIG. 7.
Figure 9:
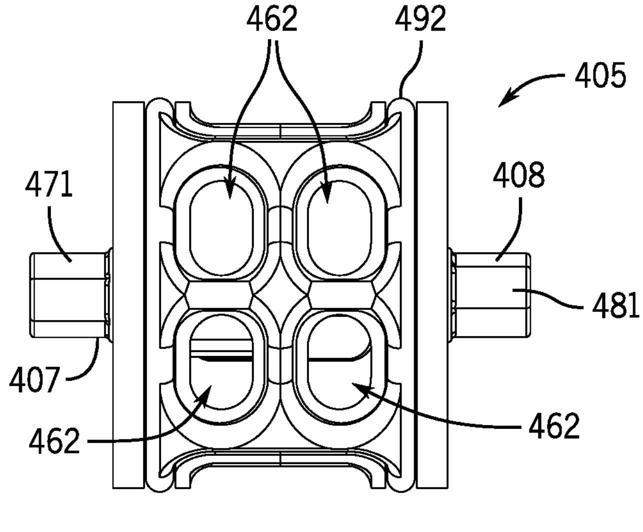
FIG. 9 is another plan view of the selection engine shown in FIG. 7.
Figure 10:
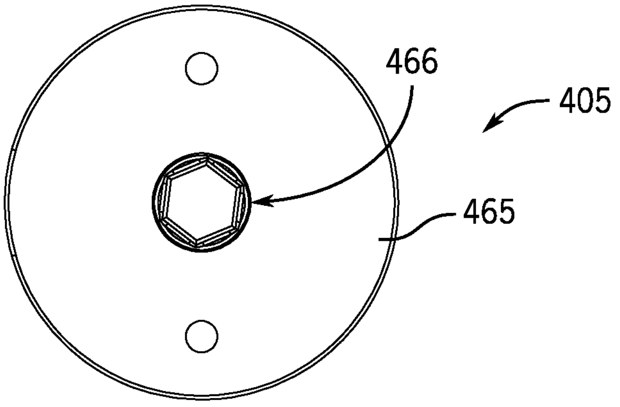
FIG. 10 is a top view of the selection engine shown in FIG. 7.
Figure 11:
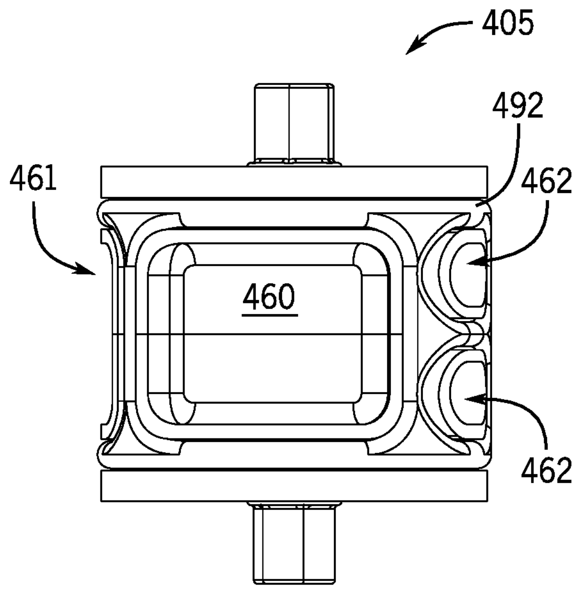
FIG. 11 is another plan view of the selection engine shown in FIG. 7.
Figure 12:
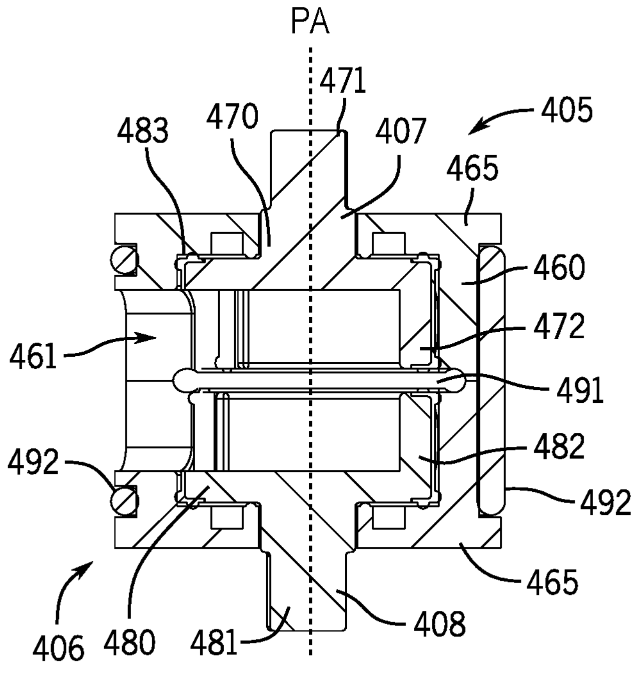
FIG. 12 is a cross-sectional view of the selection engine shown in FIGS. 7-11.

The illustrated housing 406 has a hollow cylindrical body 460 having an inlet opening/port 461 in a first side, as shown in FIGS. 8 and 12, and four outlet openings/ports 462 in a second side, as shown in FIGS. 7 and 9. Although the four outlet ports 462 are shown having a 2×2 grid arrangement, it should be appreciated that the outlet ports 462 can have another arrangement (e.g., linear, random) and can include a fewer or a greater number of outlet ports 462. The illustrated housing 406 includes end members 465 closing off the ends of the body 460. Each end member 465 includes an opening 466 (see FIG. 10) for receiving part of one of the two disks 407, 408.

At least part of each disk 407, 408 is positioned within the housing 406 to control fluid flow therethrough. As shown in FIG. 12, the first disk 407 is arranged in parallel with the second disk 408, such that each disk is approximately the same distance from the inlet port 461. The first disk 407 is stacked on top of the second disk 408, where each disk 407, 408 can rotate separately (e.g., independently) about a common pivot axis PA. The first disk 407 is substantially axially aligned with the second disk 408. Each disk 407, 408 includes a cylindrical base 470, 480 rotatably received in a bore 483 in the housing 406 (e.g., rotatable within the bore, etc.). Extending from a first side of each base 470, 480 is a shoulder 471, 481, which extends through one opening 466 (see also FIG. 10) and outside the housing 406. Extending from a second (opposite) side of each base 470, 480 is a wall 472, 482, which extends around a portion of an outer circumference of the respective base. Each wall 472, 482 associates with one or more outlet ports 462 (see also FIG. 9). As shown in FIG. 12, each wall 472, 482 is semi-annular (e.g., semi-cylindrical) and associates with two outlet ports 462 (see also FIG. 9), such that upon rotation of the disk 407, 408 relative to the housing 406, the wall 472, 482 can selectively move between several positions to control fluid flow through the associated outlet ports 462. Each disk 407, 408 is movable through, for example, the respective shoulder 471, 481, which is configurable to be moved manually or automatically.

In a first or closed position of each wall 472, 482, the respective wall 472, 482 is proximate to and covers all (e.g., both) of the associated outlet ports 462 to block water from flowing through the outlet ports 462. In a second position (e.g., first open position), each wall 472, 482 covers a first outlet port 462 to block fluid flow therethrough while uncovering a second outlet port 462 to allow fluid flow therethrough. In a third position (e.g., second open position), each wall 472, 482 covers the second outlet port 462 to block fluid flow therethrough while uncovering the first outlet port 462 to allow fluid flow therethrough. In a fourth position (e.g., a third open position), each wall 472, 482 uncovers all (e.g., both of) the first and second outlet ports 462 to allow fluid flow through both outlet ports 462.

As mentioned and shown in FIG. 12, the disks 407, 408 are independently rotatable relative to the other and, thus, can move into different rotational orientations, such that any number of outlet ports 462 (see also FIG. 9) can be open or closed by the walls 472, 482 at any one time or in the various operational modes of the device/selection engine 405. For example, the selection engine 405 is configurable so that water is output from just one of the four outlet ports 462 in a corresponding operational mode. Then, simply by selecting a different mode, water selectively outputs from any of the desired outlets, such as upon rotation one or both disks 407, 408 to block any undesired outlet ports 462 and expose any desired outlet ports 462.

The selection engine 405 can optionally include one or more seals (e.g., gaskets). As shown in FIG. 12, the illustrated selection engine 405 includes an inner seal 491 (e.g., first seal, first gasket, etc.) disposed within the bore of the housing 406 and between the walls 472, 482 of the disks 407, 408. The seal 491, as shown, has an annular shape with an end received within a cavity of the housing 406 to secure the seal 491 in place, such as during rotation of one or both of the disks 407, 408. As shown in FIGS. 8 and 12, an outer seal 492 (e.g., second seal, second gasket, etc.) is provided around at least part of the body 460 of the housing 406. The outer seal 492 can provide a watertight seal, such as between the selection engine 405 and the device in which the selection engine 405 is located and employed within.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the water delivery devices and selection engines, as shown in the various exemplary embodiments, are illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A water delivery device, comprising:

an inlet connector for coupling the water delivery device to a water supply;

a sprayface assembly comprising a plurality of nozzles that are configured to produce at least three spray patterns; and a selection engine for controlling flow to the plurality of nozzles to determine the spray pattern produced at the sprayface assembly, the selection engine including:

a housing fluidly coupling the inlet connector to the sprayface assembly, the housing defining a bore, an inlet port, and at least three outlet ports that are fluidly coupled to the inlet port by the bore;

a plurality of valve elements disposed within the housing;

a pivot plate disposed in the bore and pivotably coupled to the housing, the pivot plate coupled to the plurality of valve elements and configured to move the plurality of valve elements in response to a single actuation to switch directly from any one of the at least three spray patterns to any other one of the at least three spray patterns; and a diaphragm disposed within the bore, the diaphragm comprising a plurality of diaphragm members, each diaphragm member arranged to contact an inner surface of the pivot plate to engage a respective one of the plurality of valve elements with a respective one of the at least three outlet ports.

2. The water delivery device of claim 1, wherein the valve elements comprise a plurality of plugs that are coupled to the pivot plate, each plug configured selectively fluidly couple the inlet port to a respective one of at least three outlet ports.

3. The water delivery device of claim 2, wherein the housing further comprises a body extending from the inlet port, and an outlet plate coupled to the body at an axial end of the body, the outlet plate defining the at least three outlet ports.

4. The water delivery device of claim 1, wherein the housing defines a socket, and wherein the pivot plate comprises a ball extending from an outer surface of the pivot plate and engaging the socket, the ball and the socket forming a fulcrum about which the pivot plate pivots.

5. The water delivery device of claim 4, further comprising a biasing member disposed within the bore and extending between the housing and the pivot plate, the biasing member pressing against the pivot plate to hold the ball in the socket.

6. The water delivery device of claim 1, wherein the selection engine is axially aligned with the sprayface assembly.

7. The water delivery device of claim 1, wherein the housing is spaced apart from the pivot plate by a biasing member that is disposed at a central position along the pivot plate.

* * * * *